United States Patent [19]

Büthker

[11] Patent Number: 5,272,613
[45] Date of Patent: Dec. 21, 1993

[54] CASCADED RECTIFIER AND TWO SWITCHED VOLTAGE CONVERTER CIRCUITS WITH HARMONICS SUPPRESSION

[75] Inventor: Henricus C. J. Büthker, Eindhoven, Netherlands

[73] Assignee: U.S. Philips Corporation, New York, N.Y.

[21] Appl. No.: 841,609

[22] Filed: Feb. 25, 1992

[30] Foreign Application Priority Data

Mar. 13, 1991 [NL] Netherlands .................. 9100445

[51] Int. Cl.⁵ .................................. H02M 3/335
[52] U.S. Cl. .................................. 363/21; 323/266; 323/271; 363/71; 363/89
[58] Field of Search ............. 363/20, 21, 65, 71, 363/80, 81, 89; 323/224, 266, 271

[56] References Cited

U.S. PATENT DOCUMENTS

| | | | |
|---|---|---|---|
| 4,486,823 | 12/1984 | Palm | 363/21 |
| 4,516,168 | 5/1985 | Hicks | 363/21 |
| 4,530,043 | 7/1985 | Palm et al. | 363/21 |
| 4,679,131 | 7/1987 | Filliman | 363/21 |
| 5,019,952 | 5/1991 | Smolenski et al. | 363/16 |

FOREIGN PATENT DOCUMENTS 68878 5/1980 Japan ................................ 363/21
148074 6/1989 Japan ................................ 323/224

OTHER PUBLICATIONS

"Power Supply Circuit," IBM Tech. Discl. Bul., vol. 27, No. 11, pp. 6500–6501, Apr. 1985.

Primary Examiner—William H. Beha, Jr.
Attorney, Agent, or Firm—Bernard Franzblau

[57] ABSTRACT

A power supply circuit includes a cascade arrangement of a full-wave rectifier and a first and a second switched voltage converter. The input terminals of the first voltage converter receive a rectified supply voltage. The second switched voltage converter has input terminals connected to a first storage capacitor of the first voltage converter. The second voltage converter includes the output terminals of the power supply circuit. A control circuit controls the period of conductance of the controlled switches of the switched voltage converters with a switching period which is much shorter than the cycle period of the AC supply voltage. A first inductive element is connected via a first controlled switch across the output terminals of the full-wave rectifier during a part of the switching period. A first rectifier diode is connected to the first inductive element so that the diode is non-conducting during this part of the period and, during the period when the diode is conducting, the diode current does not flow to the input terminals of the first switched voltage converter.

15 Claims, 2 Drawing Sheets

CASCADED RECTIFIER AND TWO SWITCHED VOLTAGE CONVERTER CIRCUITS WITH HARMONICS SUPPRESSION

BACKGROUND OF THE INVENTION

This invention relates to a power supply circuit comprising a cascade arrangement of a full-wave rectifier and a first and a second switched voltage converter, the first switched voltage converter comprising a first inductive element, first switching means, a first rectifier diode and a first storage capacitor and input terminals which are coupled to output terminals of the mains rectifier for receiving a rectified mains voltage. The second switched voltage converter comprises a second inductive element, second switching means, a second rectifier diode and a second storage capacitor and input terminals which are connected to the first storage capacitor, said second voltage converter being coupled to output terminals of the power supply circuit for supplying an output voltage. A control circuit is provided for controlling the period of conductance of the switching means of the switched voltage converters with a switching period which is much smaller than the cycle period of the mains voltage.

Instead of using two cascade-arranged voltage converters, it is common practice to use one voltage converter with a storage capacitor between the mains rectifier and the voltage converter. A voltage ripple is then produced across this storage capacitor and this voltage ripple is corrected by means of the converter. Moreover, the output voltage is maintained at a constant value, independent of load variations and/or mains voltage variations.

A drawback of this construction is that the input storage capacitor must have a large value if the above-mentioned circuit is to operate satisfactorily. Consequently, the current taken from the mains is peak-shaped and discontinuous, resulting in strong disturbances of the mains supply (mains interference). Mains interference is prevented by arranging a further switched voltage-converter, which is commonly referred to as a preconditioner, between the mains rectifier and the switched voltage converter. Beginning about 1996 the requirements for the prevention of mains disturbances will become stricter, which will also apply to display devices, computers and the like. In about 1996 the European standard EN 60555 based on IEC-555 will take effect. The first switched voltage converter (preconditioner) is then used to improve the duty cycle and to reduce harmonics of the current taken from the mains, while the second switched voltage converter is used to correct the mains ripple left on the storage capacitor of the first switched voltage converter.

The power supply circuit described in the opening paragraph is known from German Patent Application DE-3328723. In this solution an up-converter is used as a first converter. The object of arranging an up-converter between the mains rectifier and the existing converter is to take a continuous current from the mains. Although the current taken from the mains is continuous in this solution, the current is peak-shaped so that the mains is still polluted with higher harmonics. Moreover, this circuit also comprises a third switched converter between the second switched converter and the load, making this solution complicated and expensive.

Another solution is described in German Patent Application DE-4032199. In this Application a down-converter is used as the first converter. In this solution the current which is taken from the mains is mainly sinusoidal but discontinuous. This is due to the fact that the down-converter can only take a current from the mains when the rectified voltage exceeds the voltage across the storage capacitor of the down-converter.

SUMMARY OF THE INVENTION

One of the objects of the invention is to obviate this drawback. To this end, a power supply circuit according to the invention is characterized in that the first inductive element is connected by means of the first switching means across the output terminals of the mains rectifier during a part of the switching period and in that the first rectifier diode connected to the inductive element is non-conducting during said part, the first rectifier diode being connected to the first inductive element in such a way that the current through the diode does not flow to the input terminals of the first switched voltage converter during the period when the diode is conducting.

The invention is based on the recognition that the prevention of mains interference necessitates a rectified sine variation of the average current taken from the mains by the first voltage converter over a switching period, which current thus has the same shape as the voltage supplied by the mains rectifier, and that this can be realised by means of a voltage converter having the above-described characteristic features. This is not the case in the circuit known from German Patent Application DE-3328723. For an input voltage having a rectified sine as a waveform, the current taken from the mains has a waveform which is the square of the sine in this known circuit. Moreover, in the power supply circuit described in German Patent Application DE-4032199, the current taken from the mains has a sine waveform with discontinuities around the zero-crossings in the case of (again) a rectified sine as the waveform of the input voltage. As has been mentioned hereinbefore, this is due to the fact that the voltage across the first storage capacitor then exceeds the input voltage. By using the circuit as a preconditioner, as described in the characterizing part, it is achieved that the voltage built up across the first storage capacitor does not have any influence on the current taken from the mains.

The period of conductance of the first switching means should preferably not exhibit any mains frequency modulation. A mains frequency modulation or mains frequency variation is hereinafter understood to mean a modulation or variation which varies with the frequency of the mains and/or with harmonics of this frequency.

An embodiment of a power supply circuit according to the invention is therefore characterized in that the control signal of the first switching means is substantially independent of mains frequency variations of the rectified mains voltage.

A further embodiment of a power supply circuit according to the invention is characterized in that the control circuit comprises a differential amplifier which supplies an output signal dependent on the difference between a reference voltage received at a first input and a voltage received at a second input which is dependent on the voltage across the second storage capacitor, the control circuit further comprising a first and a second pulse width modulator for controlling the first and the second switching means, respectively, and a low-pass filter. The first pulse width modulator receives the output signal from the differential amplifier via the low-pass filter and the second pulse width modulator directly receives the output signal from the differential amplifier.

To prevent the control signal for the first switching means from having a mains frequency modulation (for example, 100 Hz), the output signal of the differential amplifier is applied to the first pulse width modulator via the low-pass filter.

In accordance with a further aspect of the invention, the variations of the period of conductance of the second switching means are generally so small that they are also permissible for the first switching means without aggravating the mains disturbances. Based on this recognition, a further embodiment of a power supply circuit according to the invention is characterized in that the first and the second switching means jointly constitute one switching element comprising one controllable switch and a diode, the control circuit controlling the controllable switch.

This embodiment has the advantage that the power supply circuit comprises only one controlled switch and one pulse width modulator, thus simplifying the circuit and reducing its cost.

A preferred embodiment is characterized in that the switching means are combined in such a way that the largest of the two currents flows through the controllable switch and that the difference of the two currents flows through the diode.

This embodiment has the further advantage that the current flowing through the controlled switch is not the sum of the currents through the two controlled switches, but is the larger of the two currents. The difference of the two currents instead of one of the two currents flows through the diode.

Since the currents flowing through the switches are small in this preferred embodiment, the power which is dissipated in the switches will be smaller than in the other embodiments and it will be sufficient to use less expensive components.

BRIEF DESCRIPTION OF THE DRAWINGS

Embodiments of the invention will now be described in greater detail, by way of example, with reference to the accompanying drawings, in which.

DESCRIPTION OF THE PREFERRED EMBODIMENTS

Figure 1:
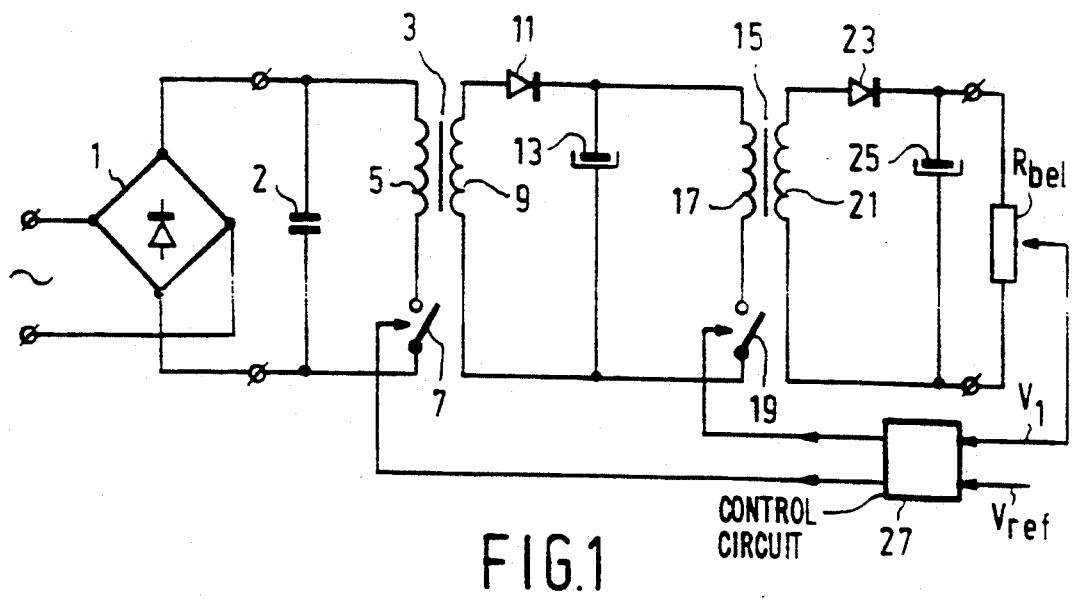
FIG. 1 shows a first embodiment of a power supply circuit according to the invention.

FIG. 1 shows a main rectifier 1 whose input terminals are connected to the AC supply voltage mains. A small capacitor 2 for filtering out high-frequency interferences is connected across the output terminals of the mains rectifier. A series arrangement of a primary winding 5 of a transformer 3 and a first controllable switch 7 is also connected to the output terminals of the mains rectifier. One end of a secondary winding 9 of the transformer 3 is connected to the anode of a diode 11. The cathode of the diode is connected to a first storage capacitor 13, the other terminal of which is connected to the other end of the secondary winding of the transformer 3. A series arrangement of a primary winding 17 of a second transformer 15 and a second controllable switch 19 is arranged parallel to the first storage capacitor 13. An anode of a second diode 23 is connected to a secondary winding of the second transformer. The cathode of the diode 23 is connected to a second storage capacitor 25, the other terminal of which is connected to the other end of the secondary winding 21. A further circuit to be fed with a direct voltage and designated by means of a load Rbel is connected across the storage capacitor 25. A control circuit 27 receives a reference voltage Vref as a first input signal and a signal V1 as a second input signal. The signal V1 is dependent on the output voltage of the power supply circuit and, with reference thereto, determines the control signals for the two switches (7 and 19). The transformer 3, the switch 7, the diode 11 and the storage capacitor 13 constitute a first switched voltage converter. The transformer 15, the switch 19, the diode 23 and the storage capacitor 25 constitute a second switched voltage converter.

The power supply circuit operates as follows. The mains rectifier 1 full-wave rectifies the AC mains voltage. Due to the absence of a large storage capacitor across the output terminals of the rectifier (the capacitor 2 has only a relatively small value of, for example, 1 microF) a voltage approximately having the shape of a rectified wave is produced across these terminals. This voltage is applied to the series circuit of the primary winding 5 and the switch 7. During the period when the switch 7 is conducting, magnetic energy is built up in the transformer 3. During the period when the switch 7 is non-conducting, this magnetic energy is stored in the storage capacitor 13 via the secondary winding 9 and the diode 11. In this way a direct voltage with a ripple at the double mains frequency is stored in the storage capacitor 13. This voltage is present across the series circuit of the second primary winding 17 and the second switch 19. During the period when the switch 19 is conducting, magnetic energy is stored in the second transformer 15. During the period when the switch 19 is non-conducting, this magnetic energy is stored in the second storage capacitor 25 via the secondary winding 21 and the diode 23. The voltage across this storage capacitor is stabilized by varying the duty cycle of the switch 19. The control circuit 27 (shown in greater detail in FIG. 2) determines the duty cycle for the switches with reference to the output voltage and a reference voltage Vref. The switches are high-frequency switched (for example, at a switching frequency of 31.25 kHz).

The two transformers 3 and 15 have discontinuous transformer currents, while during each period of the switching frequency the magnetic energy stored in the relevant transformer during the first part of the period is supplied again during the second part of the period. The current through the primary winding of the transformer increases linearly from zero in each period. The larger the voltage across the transformer and the switch, the faster the current will increase.

Figure 2:
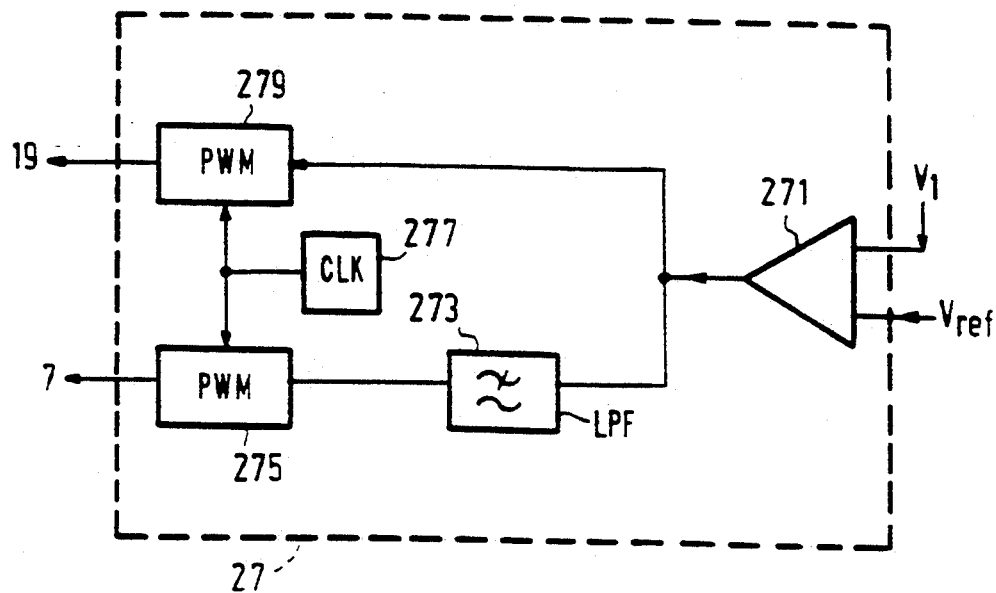
FIG. 2 shows a control circuit for use in a power supply circuit according to the invention.

FIG. 2 shows the control circuit 27 in greater detail. A differential amplifier 271 receives the reference voltage Vref at a first input and the voltage V1 at a second input and an output supplies the differences between these two voltages in an amplified form. This difference voltage is applied to a low-pass filter 273. An output of the low-pass filter is connected to an input of a first pulse width modulator 275. Dependent on the voltage at the input, the pulse width modulator supplies a control signal to the switch 7 (not shown) under the control of a clock generator 277. Since the pulse width modulator 275 receives the difference voltage from the differential amplifier via the low-pass filter, mains frequency variations are filtered out.

Figure 3:
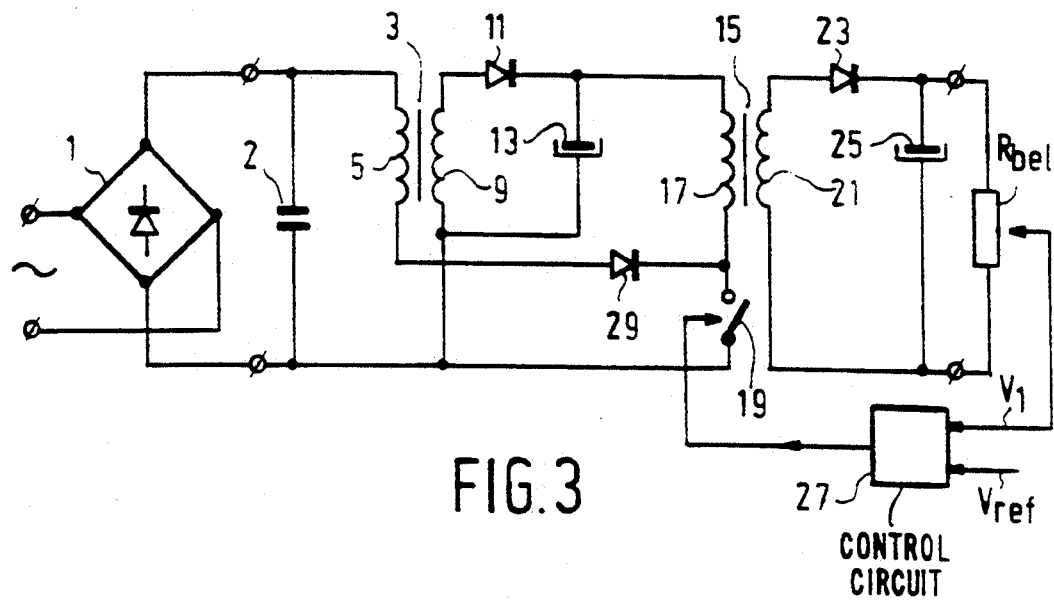
FIG. 3 shows a second embodiment of a power supply circuit according to the invention.

The output of the differential amplifier 271 is also connected to a second pulse width modulator 279 which is also controlled by the clock generator 277. An output of the pulse width modulator 279 applies a control signal to the switch 19 (not shown). The periods of conductance of the switch 19 are therefore modulated by possible mains frequency variations of the voltage V1 so that these variations are inhibited in the output voltage across the capacitor 25. In contrast thereto, the periods of conductance of the switch 7 are not modulated by said mains frequency variations. It has been found that this leads to an optimum reduction of mains pollution. However, a circuit of considerably lower cost can be obtained if the two switches are simultaneously opened and closed, with the periods of conductance for the switch 7 being mains frequency modulated in the same way as those for the switch 19. This is shown in FIG. 3 in which identical elements have the same reference numerals. If the two switches 7 and 19 (of FIG. 1) have the same duty cycle, the two switches 7 and 19 can be replaced by a single controlled switch 19 and a diode 29 (to be considered as a non-controlled switch). This diode creates a conducting path between the primary winding 5 and the junction point of the primary winding 17 and the switch 19. If, instead of the diode 29, a conducting connection were made, unwanted short-circuit currents would flow in the circuit 9, 11, 17, 5, 1. Otherwise, the operation of the circuit will be mainly the same. During the period when the switch 19 is conducting a linearly increasing current will flow through the primary winding 5 of transformer 3 and a linearly increasing current will also flow through the primary winding 17 of transformer 15. The sum of the two currents through the two switches in the circuit of FIG. 1 now flows through the switch 19 during this part of the period. The switch 19 is also high-frequency switched in this circuit and the duty cycle is also adapted to the output voltage (across a load Rbel.).

Figure 4:
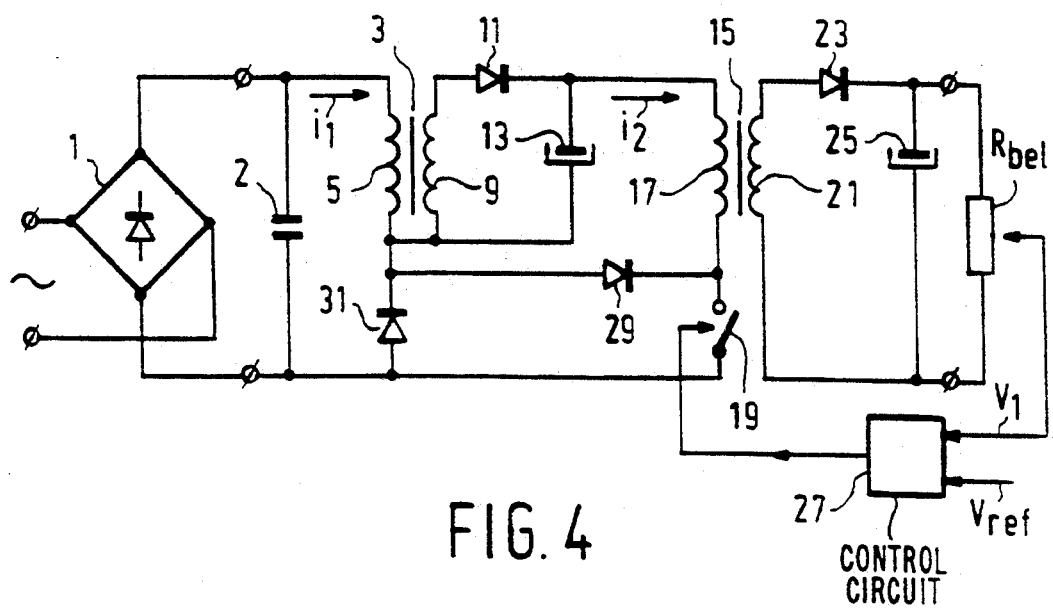
FIG. 4 shows a preferred embodiment of a power supply circuit according to the invention.

In FIG. 4, elements identical to those in FIG. 1 and/or FIG. 3 have the same reference numerals. In this embodiment the primary winding 5 and the secondary winding 9 of the transformer 3 are coupled together at the end to which diode 29 is connected. The junction point of the diode 29 and the two windings 5 and 9 is connected, via a diode 31, to the terminal of the switch 19 which is not connected to the primary winding 17. During the part of the period when the switch 19 is conducting, a current i1 flows through the primary winding 5, while a current i2 flows through the primary winding 17 during this part of the period. To prevent the sum of the two currents (i1+i2) from flowing through the switch 19 (as in FIG. 3), a different conducting path must be found for one of the currents. If the current i1 is larger than the current i2, the current i1 can flow through the diode 29 from the primary winding to the switch 19. The current i2 can then also flow through the diode 29 from the primary winding 17 to the secondary winding 9 (because i1>i2, and the connection of the primary winding 5 and the secondary winding 9 of the first transformer). If the current i2 is larger than the current i1, there must be a conducting path from the low end of the switch 19 to the secondary winding 9. The diode 31 may be used for this purpose. The current i1 can then also flow through the diode 31 from the primary winding 5 to the low end of the capacitor 2 (because i2>i1).

If it is known in advance which of the two currents is the largest, either the diode 29 (at i2>i1) or the diode 31 (at i1>i2) can be omitted from the circuit. Due to this solution the switches (31 and 19) dissipate much less energy than the switches 29 and 19 in the circuit according to FIG. 3. It is therefore sufficient to use less expensive elements.

A number of embodiments of power supply circuits according to the invention have been described hereinbefore. The second switched voltage converter is always a flyback converter in the embodiments described hereinbefore. This is not essential and this converter can be replaced without any difficulty by any known type of converter. The second switched voltage converter may also be connected to a plurality of rectifier circuits such as flyback rectifiers, which similarly to the diode 23, conduct during the period when the switch 19 is non-conducting, and forward interval rectifiers, which conduct simultaneously with the switch 19. The first switched voltage converter may also be connected to a plurality of flyback rectifiers, but to prevent extra mains pollution, it is preferably not connected to forward interval rectifiers. Moreover, in embodiments which do not require any mains separation, an autotransformer or a wound coil or ordinary coil can be used instead of the transformer 5.

I claim:

1. A power supply circuit comprising: a cascade arrangement of a full-wave rectifier and a first and a second switched voltage converter, the first switched voltage converter comprising a first inductive element, first switching means, a first rectifier diode and a first storage capacitor and input terminals which are coupled to output terminals of the full-wave rectifier for receiving a rectified AC supply voltage, the second switched voltage converter comprising a second inductive element, second switching means, a second rectifier diode and a second storage capacitor and input terminals which are connected to the first storage capacitor, said second voltage converter being coupled to output terminals of the power supply circuit for supplying an output voltage, and a control circuit for controlling the period of conductance of the first and second switching means with a switching period which is much shorter than the cycle period of the AC supply voltage, the control circuit providing the first switching means with a control signal which is substantially independent of the AC supply frequency variations of the rectified AC supply voltage, wherein the first inductive element is connected by means of the first switching means across the output terminals of the full-wave rectifier during a part of the switching period and the first rectifier diode is connected to the first inductive element such that it is non-conducting during said part of the switching period, the first rectifier diode being connected to the first inductive element in a manner such that a current through the first diode does not flow to the input terminals of the first switched voltage converter during the period when the first diode is conducting.

2. A power supply circuit comprising:

a pair of input terminals for connection to a source of AC supply voltage, a rectifier circuit having input terminals coupled to said pair of input terminals and output terminals for supplying a pulsatory rectified supply voltage, first and second switched voltage converters connected in cascade between the output terminals of the rectifier circuit and a pair of DC output terminals of the power supply circuit, the first switched voltage converter comprising a first inductance means, a first diode and a first storage capacitor, the second switched voltage converter comprising a second inductance means, a second diode and a second storage capacitor coupled to said pair of DC output terminals, controlled switching means coupled to said first and second inductance means for controlling current flow therein, and a control circuit coupled to the switching means so as to control the conductance period thereof at a frequency which is much higher than the frequency of the AC supply voltage, said control circuit controlling the switching means so that during a part of the switching period the first inductance means receives a current from the output terminals of the rectifier circuit, said first diode being coupled to the first inductance means such that it is nonconductive during said part of the switching period and so that during a part of the period when the first diode is conductive it does not pass a current to the output terminals of the rectifier circuit, wherein said rectifier circuit comprises a full-wave rectifier and said pulsatory rectified supply voltage comprises half sine waves, said switching means comprises first and second controllable switches, the first inductance means comprises a first transformer having a primary winding coupled to the output terminals of the rectifier circuit via the first controllable switch and a secondary winding coupled to a series circuit of the first diode and the first storage capacitor, the second inductance means comprises a second transformer having a primary winding connected in series with the second controllable switch and a secondary winding coupled to a second series circuit of the second diode and the second storage capacitor, and the control circuit is responsive to an output voltage at said pair of DC output terminals so as to modulate the conductance period of the first and second controllable switches so as to regulate said output voltage while at the same time inhibiting harmonics in the AC supply voltage.

3. A power supply circuit as claimed in claim 2 wherein the control circuit provides a first control signal for controlling the first controllable switch and which first signal is free of AC supply voltage frequency modulation, and provides a second control signal for controlling the second controllable switch.

4. A power supply circuit comprising:

a pair of input terminals for connection to a source of AC supply voltage, a rectifier circuit having input terminals coupled to said pair of input terminals and output terminals for supplying a pulsatory rectified supply voltage, first and second switched voltage converters connected in cascade between the output terminals of the rectifier circuit and a pair of DC output terminals of the power supply circuit, the first switched voltage converter comprising a first inductance means, a first diode and a first storage capacitor, the second switched voltage converter comprising a second inductance means, a second diode and a second storage capacitor coupled to said pair of DC output terminals, controlled switching means coupled to said first and second inductance means for controlling current flow therein, and a control circuit coupled to the switching means so as to control the conductance period thereof at a frequency which is much higher than the frequency of the AC supply voltage, said control circuit controlling the switching means so that during a part of the switching period the first inductance means receives a current from the output terminals of the rectifier circuit, said first diode being coupled to the first inductance means such that it is nonconductive during said part of the switching period and so that during a part of the period when the first diode is conductive it does not pass a current to the output terminals of the rectifier circuit, wherein the switching means comprise first and second controllable switches coupled to the first and second inductance means, respectively, and wherein the control circuit comprises;

a comparator circuit having a first input for a reference voltage and a second input for a voltage dependent on an output voltage at the DC output terminals, means for applying an output signal of the comparator circuit to a first pulse width modulator via a low pass filter and directly to a second pulse width modulator, and means for applying control signals from the first and second pulse width modulators to respective control electrodes of the first and second controllable switches, respectively.

5. A power supply circuit comprising: a cascade arrangement of a full-wave rectifier and a first and a second switched voltage converter, the first switched voltage converter comprising a first inductive element, first switching means, a first rectifier diode and a first storage capacitor and input terminals which are coupled to output terminals of the full-wave rectifier for receiving a rectified AC supply voltage, the second switched voltage converter comprising a second inductive element, second switching means, a second rectifier diode and a second storage capacitor and input terminals which are connected to the first storage capacitor, said second voltage converter being coupled to output terminals of the power supply circuit for supplying an output voltage, and a control circuit for controlling the period of conductance of the first and second switching means with a switching period which is much shorter than the cycle period of the AC supply voltage, wherein the first inductive element is connected by means of the first switching means across the output terminals of the full-wave rectifier during a part of the switching period and the first rectifier diode is connected to the first inductive element such that it is nonconducting during said part of the switching period, the first rectifier diode being connected to the first inductive element in a manner such that a current through the first diode does not flow to the input terminals of the first switched voltage converter during the period when the first diode is conducting, wherein the control circuit comprises; a differential amplifier which supplies an output signal dependent on the difference between a reference voltage received at a first input and a voltage received at a second input and which is dependent on a voltage across the second storage capacitor, a first and a second pulse width modulator for controlling the first and the second switching means, respectively, and a low-pass filter, the first pulse width modulator receiving the output signal from the differential amplifier via the low-pass filter and the second pulse width modulator directly receiving the output signal from the differential amplifier.

6. A power supply circuit as claimed in claim 5, wherein the first inductive element includes a first transformer and the first switching means comprises a first controllable switch connected in series with a primary winding of the first transformer, and the first rectifier diode and the first storage capacitor are connected to a secondary winding of the first transformer, and the second inductive element includes a second transformer and the second switching means comprises a second controllable switch connected in series with a primary winding of the second transformer across the first storage capacitor, means connecting a secondary winding of the second transformer to the second rectifier diode and the second storage capacitor, and wherein the control circuit measures the output voltage so as to modulate the period of conductance of the first and second switches.

7. A power supply circuit comprising: a cascade arrangement of a full-wave rectifier and a first and a second switched voltage converter, the first switched voltage converter comprising a first inductive element, first switching means, a first rectifier diode and a first storage capacitor and input terminals which are coupled to output terminals of the full-wave rectifier for receiving a rectified AC supply voltage, the second switched voltage converter comprising a second inductive element, second switching means, a second rectifier diode and a second storage capacitor and input terminals which are connected to the first storage capacitor, said second voltage converter being coupled to output terminals of the power supply circuit for supplying an output voltage, and a control circuit for controlling the period of conductance of the first and second switching means with a switching period which is much shorter than the cycle period of the AC supply voltage, wherein the first inductive element is connected by means of the first switching means across the output terminals of the full-wave rectifier during a part of the switching period and the first rectifier diode is connected to the first inductive element such that it is nonconducting during said part of the switching period, the first rectifier diode being connected to the first inductive element in a manner such that a current through the first diode does not flow to the input terminals of the first switched voltage converter during the period when the first diode is conducting, wherein the first inductive element includes a first transformer and the first switching means comprises a first controllable switch connected in series with a primary winding of the first transformer, and the first rectifier diode and the first storage capacitor are connected to a secondary winding of the first transformer, and the second inductive element includes a second transformer and the second switching means comprises a second controllable switch connected in series with a primary winding of the second transformer across the first storage capacitor, means connecting a secondary winding of the second transformer to the second rectifier diode and to the second storage capacitor, and the control circuit is responsive to the output voltage so as to modulate the period of conductance of the first and second switches.

8. A power supply circuit as claimed in claim 7, wherein the control signal of the first switching means is substantially independent of AC supply frequency variations of the rectified AC supply voltage.

9. A power supply circuit comprising:
a pair of input terminals for connection to a source of AC supply voltage,
a rectifier circuit having input terminals coupled to said pair of input terminals and output terminals for supplying a pulsatory rectified supply voltage,
first and second switched voltage converters connected in cascade between the output terminals of the rectifier circuit and a pair of DC output terminals of the power supply circuit,
the first switched voltage converter comprising a first inductance means, a first diode and a first storage capacitor,
the second switched voltage converter comprising a second inductance means, a second diode and a second storage capacitor coupled to said pair of DC output terminals,
controlled switching means coupled to said first and second inductance means for controlling current flow therein,
a control circuit coupled to the switching means so as to control the conductance period thereof at a frequency which is much higher than the frequency of the AC supply voltage, said control circuit controlling the switching means so that during a part of the switching period the first inductance means receives a current from the output terminals of the rectifier circuit, said first diode being coupled to the first inductance means such that it is nonconductive during said part of the switching period and so that during a part of the period when the first diode is conductive it does not pass a current to the output terminals of the rectifier circuit, and
wherein said switching means comprises a controllable switch, and a third diode coupled to said first and second inductance means and with the controllable switch controlled by the control circuit.

10. A power supply circuit as claimed in claim 9 wherein the first voltage converter is connected to the rectifier circuit so that the first voltage converter draws a rectified sine variation of the average current from the AC supply voltage over a switching period, and
the first inductance means comprises a transformer having a primary winding coupled to the output terminals of the rectifier circuit and a secondary winding coupled to the first diode and the first storage capacitor such that energy is transferred to the first storage capacitor via the first diode during a time period when the switching means is nonconductive.

11. A power supply circuit as claimed in claim 9 wherein first and second currents flow through the first and second inductance means, respectively, and said controllable switch and third diode are connected in circuit so that the larger of the first and second currents flows through the controllable switch and a difference of said first and second currents flows through the third diode.

12. A power supply circuit as claimed in claim 11 wherein;
   the first inductance means comprises a first transformer having a primary winding and a secondary winding coupled together at one end,
   means connecting the first diode and the first storage capacitor to the secondary winding,
   the second inductance means comprises a second transformer having a primary winding connected in series with the controllable switch and a secondary winding coupled to the second diode,
   means connecting the third diode to said one end of the primary and secondary windings of the first transformer and to a junction point between the primary winding of the second transformer and the controllable switch, and
   a further diode connected to one output terminal of the rectifier circuit and to said one end of the primary and secondary windings of the first transformer, and wherein
   the control circuit is responsive to an output voltage at said pair of DC output terminals to modulate the conductance period of the controllable switch.

13. A power supply circuit as claimed in claim 12 wherein the third diode is polarized in the direction from said one end of the primary and secondary windings of the first transformer to said junction point and the further diode is polarized in the direction from said one output terminal of the rectifier circuit to said one end of the primary and secondary windings of the first transformer.

14. A power supply circuit as claimed in claim 9 wherein;
   the first inductance means comprises a first transformer having a primary winding and a secondary winding coupled to the first diode and to the first storage capacitor,
   the second inductance means comprises a second transformer having a primary winding connected in series with the controllable switch and a secondary winding coupled to the second diode and to the second storage capacitor,
   means coupling said third diode to the primary winding of the first transformer and to a junction point between the primary winding of the second transformer and the controllable switch, and
   the control circuit is responsive to an output voltage at said pair of DC output terminals so as to modulate the conductance period of the controllable switch.

15. A power supply circuit as claimed in claim 14 wherein the third diode is connected between said primary winding and said junction point and is polarized in the direction from said primary winding to said junction point.

* * * * *